US010207950B2

United States Patent
Lee et al.

(10) Patent No.: US 10,207,950 B2
(45) Date of Patent: Feb. 19, 2019

(54) GLASS LIGHT GUIDING PLATE

(71) Applicant: LG CHEM, LTD., Seoul (KR)

(72) Inventors: Chang-Hee Lee, Daejeon (KR); Hyun-Jin Shim, Daejeon (KR); Byung-Kook Choi, Daejeon (KR); Jun-Bo Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/744,728

(22) PCT Filed: Sep. 26, 2016

(86) PCT No.: PCT/KR2016/010777
§ 371 (c)(1),
(2) Date: Jan. 12, 2018

(87) PCT Pub. No.: WO2017/052338
PCT Pub. Date: Mar. 30, 2017

(65) Prior Publication Data
US 2018/0208500 A1    Jul. 26, 2018

(30) Foreign Application Priority Data
Sep. 25, 2015    (KR) .................... 10-2015-0136887

(51) Int. Cl.
| G02B 6/00 | (2006.01) |
| C03C 13/04 | (2006.01) |
| C03C 3/083 | (2006.01) |
| C03C 3/091 | (2006.01) |
| F21V 8/00 | (2006.01) |
| G02F 1/1335 | (2006.01) |
| C03C 3/11 | (2006.01) |
| C03C 21/00 | (2006.01) |

(52) U.S. Cl.
CPC ............ *C03C 13/046* (2013.01); *C03C 3/083* (2013.01); *C03C 3/091* (2013.01); *C03C 3/11* (2013.01); *C03C 21/002* (2013.01); *G02B 6/0093* (2013.01); *G02F 1/133524* (2013.01)

(58) Field of Classification Search
CPC . C03C 13/046; C03C 3/083; G02F 1/133524; G02B 6/0093
See application file for complete search history.

(56) References Cited

U.S. PATENT DOCUMENTS

| 8,039,410 | B2 | 10/2011 | Kolberg et al. | |
| 9,120,699 | B2 * | 9/2015 | Nakane | ............... C03C 1/004 |
| 9,346,705 | B2 * | 5/2016 | Kiczenski | ............... B32B 17/00 |
| 9,919,949 | B2 * | 3/2018 | Kawamoto | ............. C03C 3/091 |
| 2006/0120105 | A1 | 6/2006 | Fechner et al. | |
| 2011/0034314 | A1 | 2/2011 | Ogino | |

FOREIGN PATENT DOCUMENTS

| JP | 2015072896 | 4/2015 |
| KR | 10-2012-0016906 | 2/2012 |

* cited by examiner

*Primary Examiner* — Ellen Kim
(74) *Attorney, Agent, or Firm* — Dentons US LLP (57) ABSTRACT

A glass light-guiding plate which has high-temperature stability and is advantageous in being manufactured in a slim profile is provided. The glass light-guiding plate includes a glass plate including 75 to 85 wt % $SiO_2$, 5 to 20 wt % $B_2O_3$, 1 to 5 wt % $Al_2O_3$, 3 to 8 wt % $R_2O$ (here, R is at least one of Li, Na, and K), and $Fe_2O_3 < 0.0025$ wt %.

11 Claims, 4 Drawing Sheets

GLASS LIGHT GUIDING PLATE

This application is a National Stage Application of International Application No. PCT/KR2016/010777 filed on Sep. 26, 2016, which claims priority to and the benefit of Korean Patent Application No. 10-2015-0136887, filed on Sep. 25, 2015 in the Korean Intellectual Property Office, all of which are incorporated herein in their entirety by reference for all purposes as if fully set forth herein.

TECHNICAL FIELD

The present application claims priority to Korean Patent Application No. 10-2015-0136887 filed on Sep. 25, 2015 in the Republic of Korea, the disclosure of which is incorporated herein by reference.

The present disclosure relates to a glass light-guiding plate, and more specifically, to a glass light-guiding plate using borosilicate glass, a backlight unit and a display device including the same, and a manufacturing method thereof.

BACKGROUND ART

Generally, liquid crystal displays (LCDs) are primarily used for display units such as notebook computers, desktop computers, and TVs due to advantages of implementing a lightweight and slim profile and low power consumption. However, since an LCD is not a device which spontaneously emits light but a light-receiving device, a backlight unit is required in addition to a liquid crystal screen.

Figure 1:
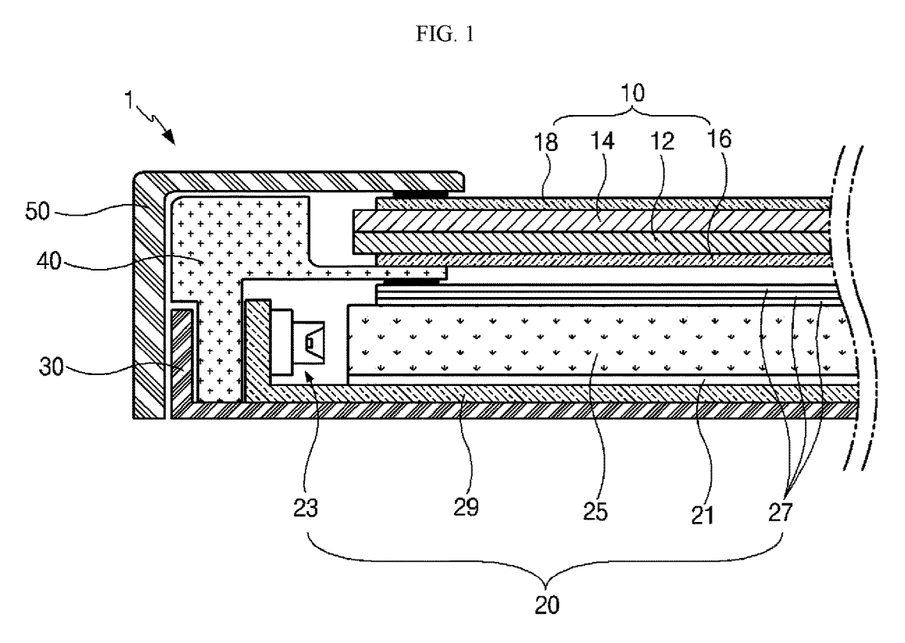
FIG. 1 is a schematic cross-sectional view of a part of an LCD according to a related art.

FIG. 1 is a schematic cross-sectional view of a part of an LCD according to a related art.

Referring to FIG. 1, the LCD 1 according to the related art includes a liquid crystal panel 10, a backlight unit 20, a cover bottom 30, a guide panel 40, and an upper case 50.

The liquid crystal panel 10 includes a thin film transistor substrate 12 and a color filter substrate 14, which face and are attached to each other with a liquid crystal layer therebetween. Also, polarization members 16 and 18 may be respectively attached to a lower surface and an upper surface of the liquid crystal panel 10.

The backlight unit 20 includes a reflective sheet 21, a light source 23 configured to provide light to the liquid crystal panel 10, a light-guiding plate 25, a plurality of optical sheets 27, and a housing 29 configured to support the light source 23.

The cover bottom 30 includes a receiving space therein to receive the light source 23, the reflective sheet 21, the light-guiding plate 25, and the optical sheets 27, and simultaneously supports the guide panel 40. Also, the guide panel 40 is designed to support the liquid crystal panel 10. As illustrated in FIG. 1, the guide panel 40 may include a panel support portion configured to support the liquid crystal panel 10 and a lateral wall surrounding the backlight unit 20. The upper case 50 is configured to surround an upper edge part of the liquid crystal panel 10 and simultaneously surround the guide panel 40 and the lateral surface of the cover bottom 30.

In the configuration of the display device according to the related art, the light-guiding plate 25 is designed to guide light incident from the light source 23 to a direction of the liquid crystal panel 10. The light-guiding plate 25 primarily includes a polymer material such as poly methyl methacrylate (PMMA) or poly carbonate (PC). Among parts of the backlight unit 20, the light-guiding plate 25 is a core part configured to produce a plane light source by uniformly distributing, in an upper direction, light from the lateral light source 23 while minimizing a loss of the light.

However, PMMA, etc., which are materials primarily used for the light-guiding plate 25 in the related art, have disadvantages that shapes thereof are transformed and harmful volatile organic compound, etc. are generated at high temperature. Also, a coefficient of thermal expansion (CTE) is about 50 to $100 \times 10^{-6}$/K, which is high, and thus there is a limit in reducing a width of a bezel part, which is a non-display area of the liquid crystal panel 10. Furthermore, since PMMA is a polymer material and so has low mechanical rigidity, the guide panel 40, which is a metallic frame, is additionally used to reinforce the low mechanical rigidity. Also, PMMA requires a thickness of at least 3.5 mm in order to provide optical characteristics inside the backlight unit 20, which limits a slim profile of the LCD 1.

Therefore, a light-guiding plate having high-temperature stability, that is, which is not transformed even when exposed to a high temperature environment, which does not generate a harmful gas while it is used, which has a low CTE, which has high mechanical rigidity and thus does not require a metallic frame, etc., and which is advantageous in manufacturing a slim profile display device, and a manufacturing technology thereof are required.

DISCLOSURE

Technical Problem

The present disclosure is designed to solve the problems of the related art, and therefore the present disclosure is directed to providing a glass light-guiding plate which has high-temperature stability and is advantageous in being manufactured in a slim profile, and a backlight unit and a display device including the glass light-guiding plate.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a glass light-guiding plate including a glass plate including 75 to 85 wt % $SiO_2$, 5 to 20 wt % $B_2O_3$, 1 to 5 wt % $Al_2O_3$, 3 to 8 wt % $R_2O$ (here, R is at least one of Li, Na, and K), and $Fe_2O_3$<0.0025 wt %.

The glass plate may further include 0 to 0.5 wt % $SO_3$ or Cl as a clarifier.

Sum of contents of $SiO_2$, $B_2O_3$, $Al_2O_3$, $R_2O$, $Fe_2O_3$, $SO_3$, and Cl in the glass plate may be 100 wt %.

The glass plate may include $K_2O$>0.1 wt %.

The glass plate with a thickness of 2 mm may have transmittance of 92.5% or more for visible light (380 nm to 780 nm).

The glass plate may have a refractive index of 1.49 or less.

The glass plate may have a thickness of 2 mm or less.

The glass plate may include a compression stress layer on a surface thereof in which glass having the above composition is chemically reinforced.

In another aspect of the present disclosure, there is also provided a backlight unit including the glass light-guiding plate according to the present disclosure.

In still another aspect of the present disclosure, there is also provided a display device including the glass light-guiding plate according to the present disclosure.

In still another aspect of the present disclosure, there is also provided a method of manufacturing a glass light-guiding plate, the method including: combining and melting glass raw materials such that the glass raw materials include 75 to 85 wt % $SiO_2$, 5 to 20 wt % $B_2O_3$, 1 to 5 wt % $Al_2O_3$, 3 to 8 wt % $R_2O$ (here, R is at least one of Li, Na, and K), and $Fe_2O_3<0.0025$ wt %; and forming the molten glass raw materials as a glass plate.

Advantageous Effects

The present disclosure may provide a glass light-guiding plate having borosilicate glass composition.

Particularly, in one aspect of the present disclosure, compared with a light-guiding plate including a polymer material such as PMMA according to a related art, a shape of a light-guiding plate according to the present disclosure is not easily transformed and a harmful volatile organic compound, etc. may not be generated even under high temperature.

Also, in one aspect of the present disclosure, compared with a light-guiding plate including a polymer material according to a related art, a thickness of a light-guiding plate according to the present disclosure may be made thin, and mechanical physical property may be stably secured even with the thin thickness.

Therefore, in one aspect of the present disclosure, a light-guide plate of a polymer material and a metallic frame according to a related art may be replaced with the present disclosure.

Also, since the borosilicate glass light-guiding plate according to the present disclosure has high rigidity, a cover bottom or an aluminum composite material (ACM) or GCM back cover which replaces the cover bottom which has been used for maintaining mechanical rigidity of an LCD module in a related art may be deleted. Alternatively, a film, a polymer, plastic, metal, etc. which may replace an ACM, a GCM of a related art is applicable.

Furthermore, in the case of a glass light-guiding plate according to the present disclosure, chemically reinforced glass may be used. In this case, since the rigidity of the glass increases even more, a cover bottom, an ACM or GCM back cover, etc., which have been used for reinforcing rigidity of a display device according to a related art may be deleted more easily.

Also, in the case of the glass light-guiding plate, an expansion rate with respect to an external temperature change is small due to a low CTE of the glass and thus transformation does not nearly occur. Therefore, the light-guiding plate using this glass is advantageous in reducing a width of a bezel part.

As described above, since the glass light-guiding plate of the borosilicate glass composition has characteristics such as high temperature stability, a low CTE, high mechanical rigidity, the glass light-guiding plate may be widely used for fields requiring these characteristics, and preferably may be used as a light-guiding plate of an LCD.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
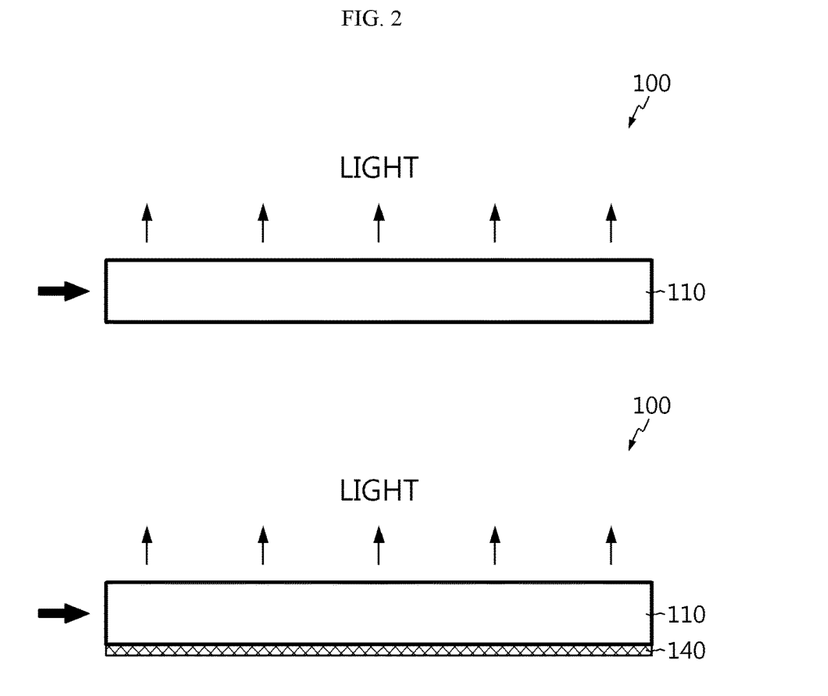
FIG. 2 is a schematic cross-sectional view of a structure of a glass light-guiding plate according to an embodiment of the present disclosure.

FIG. 2 is a schematic cross-sectional view of a structure of a glass light-guiding plate according to an embodiment of the present disclosure.

Referring to FIG. 2, the glass light-guiding plate may include one glass plate. Particularly, the glass light-guiding plate may include only one glass plate. That is, the glass plate itself may serve as the glass light-guiding plate.

The glass plate, which is a main component included in the glass light-guiding plate, may include borosilicate glass including $SiO_2$ and $B_2O_3$ as primary components.

Particularly, a borosilicate glass plate 110 forming the glass light-guiding plate 100 according to the present disclosure includes 75 to 85 wt % $SiO_2$, 5 to 20 wt % $B_2O_3$, 1 to 5 wt % $Al_2O_3$, 3 to 8 wt % $R_2O$ (here, R is at least one of Li, Na, and K), and $Fe_2O_3<0.0025$ wt %. Here, content of each component may represent a weight ratio of a relevant component with respect to an entire composition of the glass plate, for example, a total weight of oxides.

The borosilicate glass plate 110 may include 75 to 85 wt % $SiO_2$. $SiO_2$ is an oxide of a network structure-generating body forming glass, may increase chemical durability of glass, and contribute to allowing glass to have an appropriate CTE that may match a neighboring material of the glass. However, when the glass plate includes excessively high content of $SiO_2$, melting or forming of glass is difficult and viscosity increases, so clarifying and homogenization of glass may be difficult. Also, a CTE may be excessively lowered and transparency of glass may be easily lost. On the contrary, when the glass plate includes excessively low content of $SiO_2$, chemical durability may be reduced, density may increase, a CTE may increase, and a transformation point may be reduced. Therefore, the borosilicate glass 110 of the glass light-guiding plate 100 according to the present disclosure may include 75 wt % or more and 85 wt % or less SiO2.

Preferably, the borosilicate glass plate 110 of the glass light-guiding plate 100 according to the present disclosure may include 80 to 85 wt % $SiO_2$. That is, the borosilicate glass plate for the glass light-guiding plate according to the present disclosure may include 80 wt % or more $SiO_2$. Furthermore, the glass light-guiding plate 100 according to the present disclosure may include 81 wt % or more $SiO_2$. Also, the glass light-guiding plate 100 according to the present disclosure may include 82 wt % or more $SiO_2$ and may include as much as 84 wt % or more $SiO_2$.

In this range of $SiO_2$ composition, chemical durability, a CTE, density, etc., which are appropriate for being manufactured and used as a light-guiding plate, may be obtained. Particularly, in this range of $SiO_2$ composition, transmittance of visible light (380 nm to 780 nm) of the glass light-guiding plate may be improved even more.

Also, the borosilicate glass plate 110 of the glass light-guiding plate 100 according to the present disclosure may include 5 to 20 wt % $B_2O_3$. $B_2O_3$ is an oxide of a network structure-generating body of glass, may improve melting reaction of glass, reduce a CTE, improve devitrification resistance, improve chemical durability such as BHF-resistance, and contribute to reducing density (BHF: buffered hydrofluoric acid for etching SiOx or SiNx, mixed liquid of hydrofluoric acid and ammonium fluoride). However, when the glass plate includes excessively high content of $B_2O_3$, acid resistance of glass may be reduced, density may increase and a transformation point may be reduced, so heat resistance may deteriorate. Therefore, the glass plate 110 of the glass light-guiding plate 100 according to the present disclosure may include 5 wt % or more and 20 wt % or less $B_2O_3$.

Preferably, the borosilicate glass plate 110 of the glass light-guiding plate 100 according to the present disclosure may include 6 wt % or more, more preferably, 8 wt % or more $B_2O_3$. Furthermore, the borosilicate glass plate 110 of the glass light-guiding plate 100 according to the present disclosure may include 9 wt % or more, or 9.5 wt % or more $B_2O_3$. For example, the borosilicate glass plate 110 may include 10 wt % or more, as much as 12 wt % or more $B_2O_3$.

Also, preferably, the borosilicate glass plate 110 of the glass light-guiding plate 100 according to the present disclosure may include 15 wt % or less $B_2O_3$. Furthermore, the borosilicate glass plate 110 of the glass light-guiding plate 100 according to the present disclosure may include 14 wt % or less $B_2O_3$. Also, the borosilicate glass plate 110 of the glass light-guiding plate 100 according to the present disclosure may include 13 wt % or less, or 11 wt % or less, or 10 wt % or less $B_2O_3$.

This range of $B_2O_3$ composition according to the present disclosure may complement melting property deteriorated by relatively high $SiO_2$ content, and allows visible light transmittance, chemical durability, heat resistance, and a CTE, which are excellent for being manufactured and used as a light-guiding plate, to be obtained.

Also, the borosilicate glass plate 110 of the glass light-guiding plate 100 according to the present disclosure may include 1 to 5 wt % $Al_2O_3$. $Al_2O_3$ may increase high temperature viscosity, chemical stability, heat and impact-resistance, etc. of glass, and contribute to increasing a transformation point, Young's modulus, etc of glass. However, when the glass plate includes excessively high content of $Al_2O_3$, devitrification resistance, hydrochloric acid-resistance, and BHF-resistance are reduced, and viscosity may be increased. On the contrary, the glass plate includes excessively low content of $Al_2O_3$, an addition effect thereof is difficult to properly accomplish and Young's modulus may be reduced. Therefore, the borosilicate glass plate 110 of the glass light-guiding plate 100 according to the present disclosure may include 1 wt % or more and 5 wt % or less $Al_2O_3$.

Preferably, the borosilicate glass plate 110 may include 3 wt % or less $Al_2O_3$. Furthermore, the borosilicate glass plate 110 may include 2 wt % or less $Al_2O_3$ and may include as small as 1.5 wt % or less $Al_2O_3$. This range of $Al_2O_3$ composition allows desired physical properties to be obtained in aspects of mechanical rigidity such as an elastic coefficient, chemical stability, heat-resistance, impact-resistance, or visible light transmittance, etc. which are appropriate for being used as a light-guiding plate.

Also, the borosilicate glass plate 110 of the glass light-guiding plate 100 according to the present disclosure may include 3 to 8 wt % $R_2O$ (here, R is at least one of Li, Na, and K). Particularly, $K_2O$ among $R_2O$ may meet a condition of $K_2O>0.1$ wt %.

$R_2O$ is a component which is ion-exchanged in $KNO_2$ solution, etc. during a chemical reinforcement process, and may improve melting, forming characteristic, and devitrification resistance of glass, reduce high-temperature viscosity of glass, and contribute to reducing a crack occurrence rate. However, when the glass plate includes excessively high content of $R_2O$, a CTE of glass excessively increases and so it is difficult for the glass plate to match a neighboring material, and devitrification resistance and heat and impact-resistance may be reduced. On the contrary, the glass plate includes excessively low content of $R_2O$, an addition effect thereof is difficult to accomplish and an ion-exchange performance may be reduced during a chemical reinforcement process. Therefore, the borosilicate glass plate 110 of the glass light-guiding plate 100 according to the present disclosure may include 3 wt % or more and 8 wt % or less $R_2O$ which is sum content of $Li_2O$, $Na_2O$, and $K_2O$.

Preferably, the borosilicate glass plate 110 may include 3.5 wt % or more $R_2O$. Furthermore, the borosilicate glass plate 110 may include 4 wt % or more $R_2O$. Also, the borosilicate glass plate 110 may include 7 wt % or less $R_2O$.

Furthermore, the borosilicate glass plate 110 may include 5 wt % or less $R_2O$, and may include as small as 4.5 wt % or less $R_2O$.

This range of $R_2O$ composition has advantages in obtaining melting characteristic, forming characteristic, heat and impact-resistance, an ion-exchange performance, visible light transmittance, etc. which are appropriate for being manufactured and used as a light-guiding plate.

Here, the borosilicate glass plate 110 may include 7 wt % or less $Na_2O$. For example, the borosilicate glass plate 110 may include 1 to 7 wt % $Na_2O$. Furthermore, the borosilicate glass plate 110 may include 6 wt % or less $Na_2O$ and may include as small as 3 wt % or less $Na_2O$.

Also, the borosilicate glass plate 110 may not include $Li_2O$.

Particularly, $K_2O$ among $R_2O$ may improve melting characteristic or forming characteristic of glass by reducing high-temperature viscosity of glass, and simultaneously improve devitrification resistance. However, when the glass plate includes excessively high content of $K_2O$, a CTE may excessively increase. Therefore, the glass plate may include 2 wt % or less $K_2O$ and may include as small as 1 wt % or less $K_2O$. Also, the glass plate may include 0.1 wt % or more $K_2O$. That is, the glass plate may include $K_2O$ content exceeding 0.1 wt %. This range of $K_2O$ composition allows the borosilicate glass plate 110 to have an appropriate refractive index (which is not excessively high and so does not increase reflectivity) as a light-guiding plate.

Also, the borosilicate glass plate 110 included in the glass light-guiding plate 100 according to the present disclosure may be low iron glass including $Fe_2O<0.005$ wt %. Generally, even transparent glass has a characteristic of showing light green. This is because a small amount of Fe is included in silica, which is a basic raw material of glass, and so Fe may be also included in a glass plate. To obtain more transparent glass than general glass, Fe included in the raw material should be removed. It may be considered that glass from which Fe has been removed has almost no color itself and is transparent. To make less than 0.005 wt % $Fe_2O_3$ as wt % on an oxide basis, an impurity refinement process may be required. Though it is most ideal to remove $Fe_2O_3$, since high cost is required to remove $Fe_2O_3$, it is preferable to make $Fe_2O_3$ content less than 0.005 wt %. If possible, it is preferable to make $Fe_2O_3$ content less than 0.003 wt %. More preferably, $Fe_2O_3$ content may be less than 0.0025 wt %. It is more preferable to make as small as less than 0.002 wt % $Fe_2O_3$ and make as small as less than 0.0018 wt % $Fe_2O_3$. According to this configuration, since $Fe_2O_3$ content is small, glass is not discolored, the glass light-guiding plate 100 including the borosilicate glass plate may not require use of an optical film for color correction.

When the glass light-guiding plate 100 including the borosilicate glass plate having the above composition is used, even when a high-temperature environment is generated by a light source while the glass light-guiding plate 100 is used, since a volatile organic compound, etc. are not exhausted, transformation is not easily generated by external humidity or heat, and mechanical rigidity is excellent, the glass light-guiding plate 100 may have lots of advantages compared with a light-guiding plate including a polymer material according to a related art.

Also, the borosilicate glass plate 110 may further include $SO_3$ or Cl as a clarifier. In this case, the borosilicate glass plate 110 may include 0 to 0.05 wt % $SO_3$ or Cl. Furthermore, the borosilicate glass plate 110 may include 0.1 wt % or less $SO_3$ or Cl and may include as small as 0.05 wt % or less $SO_3$ or Cl. The borosilicate glass plate 110 may include as small as 0.02 wt % or less $SO_3$ or Cl. Alternatively, the borosilicate glass plate 110 may not include $SO_3$ or Cl at all.

The borosilicate glass plate 110 for being used for the glass light-guiding plate should have no defect (bubble, stria, inclusion, pit, scratch, etc.) in an inside and a surface thereof. For this purpose, glass may be dissolved and clarified by adding a clarifier during a process of manufacturing the glass plate of the glass light-guiding plate. In this case, the borosilicate glass plate 110 of the glass light-guiding plate 100 according to the present disclosure may include 0 to 0.5 wt % $SO_3$ or Cl as a clarifier as described above. This content may be an amount remaining in glass molten liquid and also may be an amount remaining in glass after manufacturing rather than an input in a glass raw material. This clarifier and content thereof may improve a clarifying effect while a glass raw material is dissolved, and suppress generation of a reboil bubble, etc. which may be generated during agitation after clarification.

In the glass light-guiding plate 100 according to the present disclosure, the glass plate 110 may include 100 wt % which is total content of $SiO_2$, $B_2O_3$, $Al_2O_3$, $R_2O$, $Fe_2O_3$, $SO_3$, and Cl. That is, the glass plate 110 of the glass light-guiding plate according to the present disclosure may not include other components except the above components and may include only the above components. In this case, the glass plate 110 may include some of $Fe_2O_3$, $SO_3$, and Cl, or may include none of $Fe_2O_3$, $SO_3$, and For example, the glass plate 110 of the glass light-guiding plate according to the present disclosure may include only $SiO_2$, $B_2O_3$, $Al_2O_3$, $Na_2O$, $K_2O$, $Fe_2O_3$, and According to this configuration of the present disclosure, characteristics required for the glass light-guiding plate including the borosilicate glass plate may be easily obtained without addition of other raw materials. For example, in the case where the borosilicate glass plate according to the above composition is manufactured, the glass light-guiding plate having low density, a low refractive index, a low CTE, and a high flexural strength while transmittance of visible light ranging from 380 nm to 780 nm is improved even more, may be obtained.

The glass plate 110 of the glass light-guiding plate 100 according to the present disclosure may have a thickness of 2 mm or less. For example, the glass plate 110 may have a thickness of 1.8 mm or less.

According to the configuration of the present disclosure, since a thickness of the light-guiding plate used for a backlight unit may be reduced, the light-guiding plate may be advantageous in an aspect of a slim profile of a display device such as an LCD. Particularly, since the glass light-guiding plate according to the present disclosure includes borosilicate glass as a primary component, a sufficient optical characteristic may be secured even with this thin thickness. A light-guiding plate including a polymer material according to a related art requires a thickness of 3.5 mm or more, but the borosilicate glass light-guiding plate according to the present disclosure may stably secure an optical characteristic and mechanical physical properties even with a thin thickness of 2 mm or less.

Also, the glass plate 110 may have a thickness of 1 mm or more and have a thickness of as much as 1.4 mm or more. According to this configuration of the present disclosure, an optical characteristic and mechanical physical properties of the glass light-guiding plate 100 may be more stably secured.

According to composition of the borosilicate glass plate 110 of the light-guiding plate 100, having a thickness of 2 mm, transmittance of visible light in a wavelength region ranging from 380 nm to 780 nm may be maintained higher than a polymer light-guiding plate. Particularly, the borosilicate glass plate 110 having the above composition with a thickness of 2 mm may secure visible light transmittance of 92.5% or more. Furthermore, the glass plate of the glass light-guiding plate according to an aspect of the present disclosure may secure visible light transmittance of 93% or more.

According to the characteristics of the present disclosure, since a glass light-guiding plate having an excellent optical characteristic even with a thin thickness is provided, the present disclosure may be more advantageous in making a slim profile of a display device and securing an optical performance.

Also, the borosilicate glass plate 110 included in the glass light-guiding plate 100 may have a refractive index of 1.49 or less. Furthermore, the borosilicate glass plate 110 of the glass light-guiding plate 100 may have a refractive index of 1.47 or less, and particularly, may have a refractive index of 1.46 or less.

When a refractive index is reduced, surface reflection of glass induced from Lambert-Beer law is reduced and so an amount of light incident to glass may increase. This may represent an effect of increasing brightness of a screen in a liquid crystal module which uses the same amount of light. Also, according to this, the number of LEDs used for a backlight of the liquid crystal module may be reduced, and thus power consumption of the module may be reduced.

Also, the borosilicate glass plate 110 included in the glass light-guiding plate 100 according to the present disclosure may have a CTE of $7.0 \times 10^{-6}$/K or less.

Preferably, the glass plate 110 may have a CTE of $5.0 \times 10^{-6}$/K or less. The glass plate 110 may have a CTE of as small as $4.0 \times 10^{-6}$/K or less, particularly, $3.5 \times 10^{-6}$/K or less.

This low CTE may allow a size of the glass light-guiding plate 100 including the borosilicate glass plate 110 not to be changed much in response to temperature change. Therefore, since the glass light-guiding plate 100 is not easily transformed even when exposed to high temperature, the glass light-guiding plate 100 may be processed at a high temperature range and so a utilization range may extend. For example, the glass light-guiding plate 100 according to the present disclosure is easily applicable to a display device which may be raised to high temperature during use or a manufacturing process.

The borosilicate glass plate 110 of the glass light-guiding plate 100 according to the present disclosure may have density of 2.5 g/cm³ or less. Particularly, the borosilicate glass plate 110 according to an aspect of the present disclosure may have density of 2.3 g/cm³ or less. Furthermore, the borosilicate glass plate 110 according to an aspect of the present disclosure may have density of 2.2 g/cm³ or less. According to this embodiment, density of glass is low and so a lightweight glass product may be easily accomplished. Particularly, when density of glass is reduced under circumstance in which an apparatus to which glass is applied is large-sized and so an area of glass gradually increases, warping due to weight of glass itself may be reduced and weight of an apparatus to which glass has been applied may be reduced.

The borosilicate glass plate 110 of the glass light-guiding plate 100 according to the present disclosure may have a glass transition temperature Tg of 500° C. or more, preferably, 520° C. or more. This glass transition temperature is very high compared with a general polymer. Therefore, it may be considered that the glass light-guiding plate according to the present disclosure has more excellent heat resistance than a polymer light-guiding plate according to a related art.

The borosilicate glass plate 110 of the glass light-guiding plate 100 according to the present disclosure may have a working temperature $T_4$ (temperature at viscosity of $10^4$ dPas) of 1,270° C. or less, particularly, 1,250° C. or less. According to this aspect of the present disclosure, since $T_4$ related to processing temperature of the glass plate is low, processing of the glass plate becomes easy, energy and time may be reduced, and productivity of the glass plate may be improved.

The borosilicate glass plate 110 of the glass light-guiding plate 100 according to the present disclosure may have an elastic coefficient (Young's modulus) of 60 GPa or more, preferably, 65 GPa or more. In this case, an elastic coefficient of the glass light-guiding plate 100 may increase, a desired mechanical rigidity may be obtained even when a thickness of the glass light-guiding plate is reduced. Particularly, in this case, compared with a light-guiding plate of a polymer material according to a related art, more excellent mechanical rigidity may be given with the same thickness.

The borosilicate glass plate 110 of the glass light-guiding plate 100 according to the present disclosure may have a Poisson's ratio of 0.23 or less, preferably, 0.2 or less. Here, the Poisson's ratio denotes a ratio of a lateral strain $\varepsilon_d$ to a longitudinal strain $\varepsilon_l$ represented when vertical stress is applied to an object. In plain language, it refers to a ratio of a reduced width to an increased length. When simple tensile stress is applied, a complete non-compressive solid has a Poisson's ratio of 0.5, steel has a Poisson's ratio of about 0.3, concrete has a Poisson's ratio ranging from 0.1 to 0.2, and a cork has a Poisson's ratio of almost 0.

It may be considered that central tensile force and compression stress of glass are related to a Poisson's ratio, a CTE, an elastic coefficient, etc. Therefore, since the glass light-guiding plate according to the present disclosure may have appropriate central tensile force, compression stress, etc. by having the above-described Poisson's ratio, CTE, and elastic coefficient, and thus may be suitable for being used as a light-guiding plate.

The borosilicate glass plate 110 according to the present disclosure may have flexural strength, that is, bending strength of 100 MPa or more. Particularly, the borosilicate glass plate 110 may have flexural strength of 110 MPa or more, or 115 MPa or more, or as much as 130 MPa or more. According to this embodiment, since bending strength of the glass light-guiding plate is large and so the glass light-guiding plate is not easily bent, which may be advantageous in making a slim profile light-guiding plate.

In the above range of the Poisson's ratio, CTE, elastic coefficient and/or flexural strength, the glass plate 110 according to the present disclosure may stably maintain mechanical rigidity as the light-guiding plate 100 even when the glass plate 110 according to the present disclosure has a thickness of 2 mm or less. Furthermore, in the case of a pre-glass which has not been reinforcement-processed, a thickness of the glass plate 110 may be adjusted to a range from 1.4 mm or more to 2 mm or less, which may be considered as being very advantageous in an aspect of a slim profile of an LCD.

Also, the borosilicate glass plate 110 of the glass light-guiding plate 100 according to the present disclosure may be reinforced glass in which borosilicate glass of the above composition is chemically reinforcement-processed. The chemical reinforcement process of the borosilicate glass plate according to the present disclosure may be performed by a method of immersing a glass substrate in potassium nitrate solution, etc. and allowing ion-exchange to occur on the glass substrate. Alternatively, the chemical reinforcement process of the glass plate may be performed in various other methods.

Since the glass plate 110 of the glass light-guiding plate 100 according to the present disclosure has an appropriate composition such that an ion-exchange performance is favorably secured, the glass plate 110 is suitable for chemical reinforcement process and thus may be more advantageous in improving mechanical rigidity.

As described above, the glass plate 110 of the glass light-guiding plate 100 according to the present disclosure may be reinforced glass and may include a compression stress layer on a surface thereof through chemical reinforcement process. In this case, a thickness DOL of the compression stress layer of the glass plate 110 according to the present disclosure may exceed 10 μm. That is, the compression stress layer of the borosilicate glass plate 110 according to the present disclosure may have a thickness exceeding 10

μm when the borosilicate glass plate 110 is chemically reinforcement-processed. More preferably, a thickness of the compression stress layer may exceed 20 μm. More preferably, a thickness of the compression stress layer may exceed 30 μm. According to the embodiment, since the thickness of the compression stress layer is thick, mechanical rigidity of the reinforcement glass may be improved. Particularly, when the thickness of the compression stress layer is thick, glass may not be destroyed even against damage of some degree of depth.

The above chemically reinforcement-processed borosilicate glass plate 110 may maintain mechanical rigidity as the light-guiding plate 100 even with a thickness of 2 mm or less, or as small as 1.6 mm or less. Depending on a thickness and compression strength of the compression stress layer, a thickness of the chemically reinforcement-processed borosilicate glass plate 110 may be adjusted to a range from 1.4 mm or more to 1.6 mm or less. Therefore, the borosilicate glass plate 110 is more advantageous in an aspect of a slim profile of an LCD.

Also, the glass light-guiding plate 100 including the borosilicate glass plate having the above composition according to the present disclosure may not require use of an optical film for color correction. Although a light-guiding plate including a glass material according to a related art has been suggested, composition of the glass light-guiding plate according to the related art generates a difference in color coordinates and a difference in color senses between a light-receiving part to which light from a light source is incident and an opposite light-receiving part, which is an opposite side of the light-receiving part, and so an image on an LCD becomes poor. However, according to the present disclosure, such this problem is not generated or a degree thereof may be reduced. Therefore, an optical film for color correction may not be used at all.

The glass light-guiding plate 100 according to the present disclosure may be included in a backlight unit of an LCD, etc. Also, the glass light-guiding plate 100 may diffuse light incident from a lateral side, the light being emitted from a light source located at the lateral side, and may irradiate the light in a front direction.

Particularly, the glass light-guiding plate 100 according to the present disclosure may include an optical pattern (not shown) on a lower surface of the borosilicate glass plate 110, the optical pattern being configured to diffuse incident light and irradiate the incident light in a front direction. The optical pattern may be formed by forming unevenness or by coating a bead particle layer, etc. In a related art, the optical pattern has been formed by etching PMMA or coating a polymer layer on a PMMA. According to the present disclosure, since the glass plate 100 includes borosilicate glass, the optical pattern may be formed by laser etching, or printing a polymer pattern on a glass surface after manufacturing the borosilicate glass plate 110.

Figure 3:
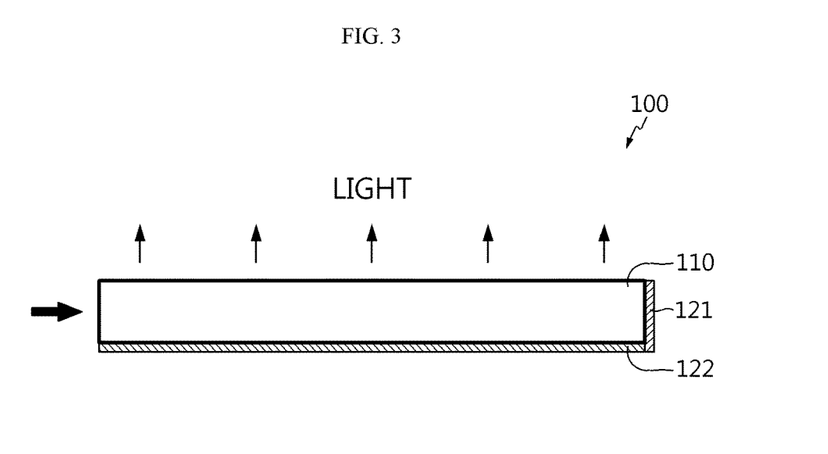
FIG. 3 is a schematic cross-sectional view of a structure of a glass light-guiding plate according to another embodiment of the present disclosure.

FIG. 3 is a schematic cross-sectional view of a structure of a glass light-guiding plate according to another embodiment of the present disclosure.

In FIG. 3, since the glass light-guiding plate 100 equally includes the borosilicate glass plate 110 as the previous embodiment, detailed description thereof is not repeated.

Referring to FIG. 3, to minimize light loss at a lateral side, the glass light-guiding plate 100 according to the present disclosure may further include a reflective layer on at least some of other surfaces except a surface (a left surface in the present drawing) to which light is incident. For example, the glass light-guiding plate 100 may include a lateral reflective layer 121 and a lower reflective layer 122 on a lateral surface and a lower surface of the borosilicate glass plate 110, respectively. Here, the reflective layer may be a coated layer including, for example, $TiO_2$ and a metallic layer. Particularly, the metallic layer may be formed by coating metals such as Ag, Al, or Cr.

That is, the lateral reflective layer 121 and/or the lower reflective layer 122 may be configured in the form of a multi-layered coated layer in which a buffer layer including $TiO_2$ is coated on a lower surface and/or a lateral surface of glass, and a metallic layer such as Ag is coated on an outer surface of the buffer layer. The coated layer may maximize brightness of a screen by minimizing leakage of light in a visible light region through a rear surface of the glass. Here, the buffer layer including $TiO_2$ may be considered as a layer serving as a buffer configured to improve adhesive force between the metallic layer and the glass, and reflection of light may be actually performed by the metallic layer such as Ag.

Depending on a process and a kind of the glass, the buffer layer may be replaced with a silicon oxide layer or a silicon nitride layer, etc. instead of $TiO_2$. Also, the metallic layer may be configured in the form of an Al-coated layer instead of Ag-coated layer. In the case of Al, since a transparent aluminum oxide layer is formed even when Al reacts to oxygen in air, reflection performance deterioration due to oxidation of the metallic layer may be reduced.

Also, according to an embodiment of the present disclosure, the lateral reflective layer 121 and/or the lower reflective layer 122 may be configured in the form of including an inner buffer layer, a metallic layer, and an outer buffer layer. For example, the lower reflective layer may be formed by coating the inner buffer layer including $TiO_2$ on a lower surface of borosilicate glass, and coating a metallic layer including Ag on an outer surface (a lower surface) of the inner buffer layer. Also, the outer buffer layer including $TiO_2$ may be coated on an outer surface (a lower surface) of the metallic layer. In this case, it may be considered that a triple lower reflective layer is provided on the lower surface of the glass plate, the triple lower reflective layer having a form in which the inner buffer layer, the metallic layer, and the outer buffer layer are sequentially stacked from an upper direction to a lower direction. Also, in this case, it may be considered that the metallic layer including Ag is buried inside the buffer layer including the inner buffer layer and the outer buffer layer.

According to this configuration of the present disclosure, since the metallic layer including a metal material such as Ag having somewhat high reactivity with oxygen in air is not exposed to outside, occurrence of performance deterioration due to oxidation may be effectively prevented. Furthermore, since a metal material such as Ag has high reactivity with oxygen and has an excellent reflectivity characteristic, reflection performance of the reflective layer may be sufficiently secured.

Meanwhile, though not shown, for another example, a surface of the borosilicate glass plate 110 to which light is incident may have a structure which is processed to be inwardly concave. According to this configuration, a surface area of a light-incident surface of the borosilicate glass plate 110 may be widened. Therefore, in this case, brightness may be increased by widening the surface area of the surface to which light from a light source is incident.

In this case, to form the structure processed to be concave, a method of rolling by using an appropriate structuring device such as pressing or stamping by using an appropriate structuring device may be used. The borosilicate glass plate 110 according to the present disclosure may be heated to temperature at which viscosity becomes appropriate for the above purpose, and the temperature may be between a softening point of glass and a working point of glass.

A backlight unit according to the present disclosure is an element included in a display device such as an LCD, and may include, as described above, the glass light-guiding plate 100 according to the present disclosure. That is, the glass light-guiding plate 100 according to the present disclosure is applicable to the backlight unit.

Also, a display device according to the present disclosure may include the glass light-guiding plate 100 according to the present disclosure. That is, the glass light-guiding plate 100 according to the present disclosure is applicable to a display device such as an LCD.

Figure 4:
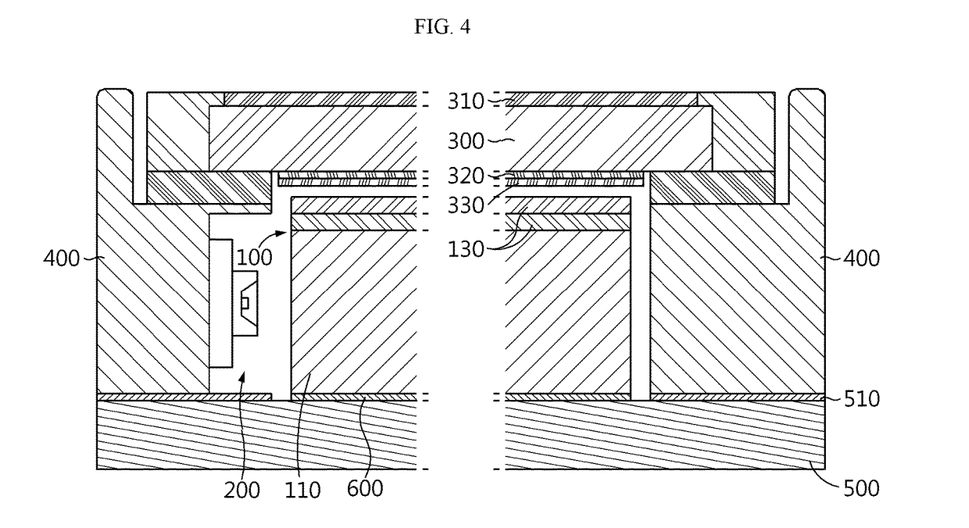
FIG. 4 is a schematic cross-sectional view of a configuration of a display device according to an embodiment of the present disclosure.

FIG. 4 is a schematic cross-sectional view of a configuration of a display device according to an embodiment of the present disclosure. Particularly, FIG. 4 shows a configuration in which the backlight unit according to the present disclosure is applied to an LCD.

Referring to FIG. 4, a display device according to the present disclosure may include a backlight unit and a liquid crystal panel.

Here, the backlight unit may include a light source 200 and a glass light-guiding plate 100.

The light source 200 is provided to one side of the glass light-guiding plate 100 and may irradiate light to allow the light to be incident to the glass light-guiding plate 100. For example, in FIG. 4, the light source 200 is provided to the left of the glass light-guiding plate 100 and may allow light to be incident to a left edge of the glass light-guiding plate 100. Also, the incident light may pass through the inside of the glass light-guiding plate 100 and may be emitted in an upper direction through an upper surface of the glass light-guiding plate 100.

The light source 200 is an element configured to generate light and a light source employed for a backlight unit of an LCD according to a related art is directly applicable. For example, the light source 200 may include at least one LED chip which may emit light and a package configured to accommodate the LED chip. The light source 200 may be arranged on a circuit board.

The glass light-guiding plate 100 may receive, from a light-incident lateral surface, light emitted from the light source 200 and emit the light to an upper emission surface. That is, the glass light-guiding plate 100 may uniformly supply light provided from the light source 200 to an upper liquid crystal panel 300.

Particularly, in the backlight unit of the display device according to the present disclosure, the glass plate 110 of the glass light-guiding plate 100 may include the above composition and/or physical properties.

The glass light-guiding plate 100 may be configured in a plate shape including two wide surfaces, that is, an upper surface and a lower surface, and may include the glass plate 110 including a glass material.

The glass light-guiding plate 100 may further include an optical sheet 130 on an upper surface of the glass plate 110. Here, the optical sheet 130 may diffuse and condense light transferred from the glass plate 110. The optical sheet 130 may include a diffusion sheet, a prism sheet, a protective sheet, etc. In this case, the diffusion sheet may prevent light from being partially concentrated by dispersing light incident from the glass plate 110. Also, the prism sheet may be formed in a form in which a triangular prism has predetermined arrangement on one side thereof. The prism sheet may be arranged on the diffusion sheet and may condense light diffused from the diffusion sheet in a direction perpendicular to the liquid crystal panel. Also, the protective sheet may be formed on the prism sheet, may protect a surface of the prism sheet, and make uniform distribution of light by diffusing light.

Here, the glass light-guiding plate 100 may be configured in a form in which one or more optical sheets 130 are bonded on an upper surface of the glass plate 110. For example, the diffusion sheet, the prism sheet, the protective sheet, etc. may be bonded and fixed using adhesive on the upper surface of the glass plate 110.

Since the glass plate according to the present disclosure has excellent rigidity, it may be easily implemented to configure the glass plate in a form in which the optical sheet is bonded on the glass light-guiding plate. According to the configuration of the present disclosure, since an integral optical structure in which the optical sheet is bonded on the glass light-guiding plate may be accomplished, manufacturing of a display device is easy, and a thickness thereof may be made thin. Also, a separate structure, etc. for fixing optical sheets on the glass plate in a stacked state are not required, and so the present disclosure may be advantageous even more in simplifying a structure of a display device, and making a lightweight and slim profile of a display device.

Meanwhile, a display device according to an aspect of the present disclosure may further include a reflective sheet 600. Here, the reflective sheet 600 may be arranged between a lower portion of the glass light-guiding plate 100 and an upper portion of a back cover 500, and may improve light efficiency by reflecting light such that the light directed to the lower portion of the glass light-guiding plate 100 is directed to the liquid crystal panel 300.

Here, the reflective sheet 600 may be allowed to have reflectivity by including, for example, polyethylene terephthalate (PET). Also, a diffusion layer including titanium dioxide may be coated one surface of the PET. Also, the reflective sheet 600 may include, for example, a material including metal such as Ag. However, the glass light-guiding plate 100 according to one aspect of the present disclosure described with reference to FIG. 3 may include the lower reflective layer 122. In this case, the reflective sheet 600 may be omitted when the display device is assembled.

The liquid crystal panel 300 may include a thin film transistor substrate and a color filter substrate which face and are attached to each other with a liquid crystal layer therebetween. Also, an upper polarization film 310 and a lower polarization film 320 may be respectively mounted on an upper portion and a lower portion of the liquid crystal panel 300. Besides, a double brightness improvement film 330 may be further provided under the lower polarization film 320.

For the liquid crystal panel 300, various liquid crystal panels known at the filing of the present disclosure may be employed. The present disclosure is not particularly limited by a specific kind or structure of the liquid crystal panel.

Also, the display device according to the present disclosure may further include a middle cabinet 400 configured to laterally surround the backlight unit and the liquid crystal panel 300, and the back cover 500 configured to support these components at the bottom. In this case, an adhesive film 510 may be arranged between the middle cabinet 400 and the back cover 500 in order to prevent moisture from penetrating into the relevant space.

As described above with reference to FIG. 1, the LCD 1 according to a related art may use the guide panel 40 and the cover bottom 30 in order to fix the liquid crystal panel 10. However, a display device according to the present embodiment may use an aluminum composite material (ACM) or GCM having a thickness of 2.0 to 2.5 mm as the back cover 500 instead of the cover bottom according to a related art. Also, the display device according to the present disclosure may include the middle cabinet 400 configured to surround an edge of the glass light-guiding plate 100 and the liquid crystal panel 300. In this case, the middle cabinet 400 may include a metallic material such as aluminum. It is considered that such a configuration may form a TV appearance by using an LCD module itself without addition of a part from a TV manufacturer and thus is more advantageous in manufacturing a thinner display device.

Furthermore, since the glass light-guiding plate 100 according to the present disclosure has excellent mechanical rigidity compared with a light-guiding plate including PMMA according to a related art, not only the cover bottom of the related art may be omitted but also the back cover 500 in the structure of FIG. 4 may be omitted.

A cover bottom substitution material such as an ACM and a GCM maintains an opaque characteristic that does not transmit light of a light source. Since the glass light-guiding plate 100 according to the present disclosure includes the borosilicate glass plate 110, the glass light-guiding plate 100 is transparent. Also, since the borosilicate glass plate 110 has high-temperature stability and mechanical physical property which may replace a light-guiding plate including a polymer material and a metallic frame according to a related art, the back cover 500 including the ACM or GCM may be omitted. In this case, instead of the back cover of a related art, a transparent film including a polymer or plastic material of a film form having a thinner thickness may be applicable. For example, the display device according to the present disclosure may be configured in a form in which a polymer film having a thickness of 0.1 mm or less is provided on a lower surface of the glass light-guiding plate 100 instead of the back cover. In this case, a thickness of the display device may be thinner even more.

Also, in the glass light-guiding plate 100 including the borosilicate glass, since a thickness of the glass plate 110 itself may be 2 mm or less, the glass light-guiding plate 100 has an advantage of making a thickness of a bezel portion thinner even more. Therefore, the glass light-guiding plate 100 is very advantageous in making a slim profile by reducing a thickness of a whole LCD module. Particularly, a thickness of PMMA according to a related art is about 3.5 mm or more, but a thickness of the glass light-guiding plate according to the present disclosure may be reduced by about 40%. Furthermore, even when a bezel portion is made thin, a CTE of the glass light-guiding plate 100 is merely a level of 1/10 of PMMA of a related art. Therefore, it is considered that transformation nearly does not occur.

The glass light-guiding plate 100 according to the present disclosure may be integrated with a light source for an LCD and other optical materials and may configure a backlight unit, and lots of structures, which have been added in a related art in order to maintain rigidity of an LCD module structure, may be omitted. Therefore, manufacturing costs and time are reduced, a structure is simplified, and a thickness and weight may be reduced.

Meanwhile, as described above, an optical pattern may be formed on at least one side of the glass light-guiding plate 100. For example, a scattering pattern (not shown) may be formed on a lower surface of the borosilicate glass plate 110 such that guided light is emitted upward.

Figure 5:
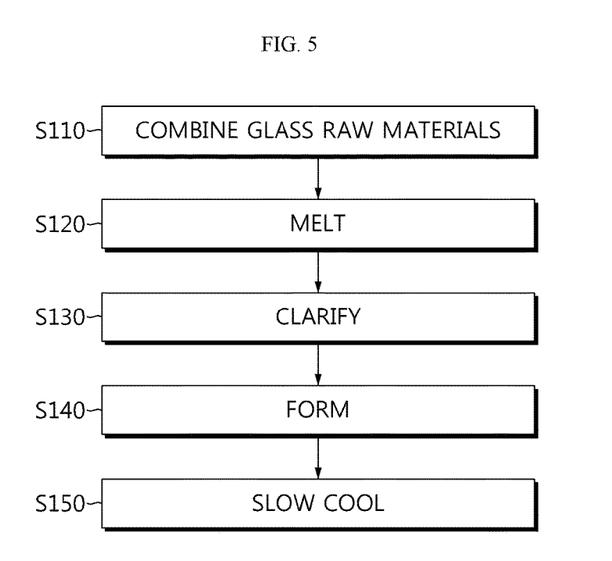
FIG. 5 is a flowchart for explaining a method of manufacturing a glass light-guiding plate according to an embodiment of the present disclosure.

FIG. 5 is a flowchart for explaining a method of manufacturing a glass light-guiding plate according to an embodiment of the present disclosure.

Referring to FIG. 5, raw materials of respective components contained in glass may be combined to form objective composition (S110). In this case, in operation S110, raw materials may be mixed to include 75 to 85 wt % $SiO_2$, 5 to 20 wt % $B_2O_3$, 1 to 5 wt % $Al_2O_3$, 3 to 8 wt % $R_2O$ (R is at least one of Li, Na, and K), less than 0.0025 wt % $Fe_2O_3$. Particularly, the raw material mixture may include 80 to 85 wt % $SiO_2$. Also, the raw material mixture may include more than 0.1 wt % $K_2O$. Here, the raw material mixture may be configured not to include other composition except the above components, that is, other oxides except $SiO_2$, $B_2O_3$, $Al_2O_3$, $R_2O$, and $Fe_2O_3$.

Next, the mixed glass raw material may be melted by heating the glass raw material to predetermined temperature, for example, 1500 to 1600° C. (S120). Operation S120 may be performed by a method in which the glass raw material mixture is heated in a melting furnace, and so molten glass may be formed.

Meanwhile, after the melting operation (S120), a clarifying operation (S130) may be performed. In the clarifying operation, $SO_3$ or Cl may be used as a clarifier. In operation S130, a bubble in molten glass may be removed by using a clarifier in a clarifying tank. In the clarifying operation, temperature of molten glass in the clarifying tank is raised and so a bubble including $O_2$, $CO_2$, or $SO_2$ included in the molten glass may grow by absorbing $O_2$ generated by a reduction reaction of the clarifier, float on a surface of the molten glass, and may be emitted (a defoaming process). Also, in the clarifying operation, after defoaming, by lowering temperature of the molten glass, $O_2$ in a bubble remaining in the molten glass may be absorbed in the molten glass by an oxidation reaction of a reactant obtained by reduction reaction of the clarifier, and so a bubble may become extinct (an absorption process). Also, the oxidation reaction and the reduction reaction by the clarifier may be performed by controlling temperature of the molten glass.

Next, after the clarifying operation, a forming operation may be formed (S140).

In the forming operation (S140), the molten glass may be formed as a glass plate. The forming operation may be formed by various methods. For example, operation S140 may be performed by a floating method of floating the molten glass to an upper portion of a float bath in which molten tin is received.

Meanwhile, though not shown in the drawing, before the forming operation (S140) after the clarifying operation (S130), an agitation process may be performed. To maintain chemical and thermal uniformity of glass, the agitation process may be performed by a method in which the molten glass passes through an agitation tank vertically directed. In this case, while the molten glass is agitated by an agitator installed in the agitation tank, the molten glass may move to a bottom portion in a vertically lower direction and may be guided to a subsequent process. Accordingly, non-uniformity of glass such as stria may be removed.

When glass is formed in operation S140, the formed glass passes through a slow cooling process in which the formed glass is transferred to a slow cooling furnace and slowly cooled (S150). After that, the slowly cooled glass is cut in a desired size, and a process such as polishing may be further performed. The borosilicate glass plate 110 may be manufactured by passing through the series of processes, and the glass light-guiding plate 100 according to the present disclosure may be manufactured by using the borosilicate glass plate.

The borosilicate glass plate manufactured by a manufacturing method according to an embodiment of the present disclosure and the glass light-guiding plate including the borosilicate glass plate may have a thickness of 2 mm or less, for example, 1.0 mm to 2.0 mm. Also, the borosilicate glass plate of the glass light-guiding plate with a thickness of 2 mm according to the present disclosure may have transmittance of visible light (380 nm to 780 nm) equal to or greater than that of a polymer light-guiding plate, and may have transmittance of 92.5% or more, particularly, 93% or more. Also, the glass plate manufactured by a manufacturing method according to an embodiment of the present disclosure may have a refractive index of 1.49 or less, preferably, 1.47 or less, and may have a CTE of $7.0 \times 10^{-6}$/K or less, preferably, $4.0 \times 10^{-6}$/K or less.

Also, a method of manufacturing the borosilicate glass plate and the glass light-guiding plate according to the present disclosure may further include chemically reinforcement processing the borosilicate glass plate manufactured by the above method. That is, the method of manufacturing the borosilicate glass plate and the glass light-guiding plate according to the present disclosure may manufacture reinforced glass by performing, after operation S150, an operation of chemically reinforcement-processing the borosilicate glass plate manufactured through operations S110 to S150. In this case, the chemically reinforcement-processing operation may be performed by immersing the borosilicate glass in molten salt such as $KNO_3$ for a predetermined time. During this process, mechanical rigidity of the borosilicate glass may be improved through ion exchange. To manufacture chemically reinforced glass, the borosilicate glass of the above composition has appropriate composition which allows ion exchange performance to be favorably secured. However, the present disclosure is not limited to this chemical reinforcement-processing method.

As a large display device gradually increases, an area of a light-guiding plate used therefor should also increase. In this case, since warping due to weight of glass itself may increase even more, lighter glass needs to be manufactured to prevent the warping. The borosilicate glass plate according to the present disclosure may be manufactured in the form of a lightweight glass plate, and so may meet above characteristic.

Also, the borosilicate glass plate according to the present disclosure has excellent mechanical rigidity and may be manufactured in the form of a lightweight glass plate. Also, the borosilicate glass plate according to the present disclosure may secure appropriate processability and formability, and the glass light-guiding plate according to the present disclosure may be manufactured by using the borosilicate glass plate.

Also, the method of manufacturing the glass light-guiding plate according to the present disclosure may further include forming a pattern structure for scattering incident light on the glass plate manufactured by the above glass-manufacturing method.

Here, for a method of forming the pattern, a printing method and a laser etching method may be used. The printing method may be performed by printing a polymer pattern for scattering on glass. Also, the laser etching method may be performed by etching a glass surface with a laser in order to form a scattering pattern. Also, since the light-guiding plate includes the borosilicate glass according to the present disclosure, a method of directly forming the pattern by applying heat when manufacturing the borosilicate glass may be used.

The pattern may be formed in a protuberance shape including a prism, a lenticular shape, a pyramid, embossing, etc., or may be formed in an uneven structure having a peak and a valley. An upper surface of a pattern having a prism or a pyramid shape may be rounded or flat. Embossing or a lenticular shape may be formed in a hemisphere shape. Also, it is preferable that the pattern has a horizontal shape with respect to an incident surface of the glass light-guiding plate.

Hereinafter, to more specifically describe the present disclosure, the present disclosure is described in detail by describing an example and a comparative example. However, an embodiment of the present disclosure may be modified in many other forms, and the scope of the present disclosure should not be construed as being limited to an embodiment described below. An embodiment of the present disclosure is provided to those of ordinary skill in the art to more completely describe the present disclosure.

Table 1 represents composition and physical properties of glass of an example according to the present disclosure. Also, Table 2 represents composition of glass according to a comparative example. For convenience of comparison, Table 2 simultaneously represents the composition and physical properties of example 1 of Table 1.

TABLE 1

|  | $SiO_2$ wt % | $Al_2O_3$ wt % | $B_2O_3$ wt % | $Na_2O$ wt % | $K_2O$ wt % | $Fe_2O_3$ wt % |
|---|---|---|---|---|---|---|
| Embodiment 1 | 85 | 1 | 9.98 | 3 | 1 | 0.0017 |
| Embodiment 2 | 82 | 1 | 12.98 | 3 | 1 | 0.0016 |
| Embodiment 3 | 80 | 2 | 10.98 | 6 | 1 | 0.0018 |
| Embodiment 4 | 78 | 5 | 9 | 7 | 1 | 0.0017 |

|  | Cl wt % | Total wt % | Density g/cm³ | Refractive index nd | CTE $10^{-6}$/ °C. | Flexural strength MPa |
|---|---|---|---|---|---|---|
| Embodiment 1 | 0.02 | 100.00 | 2.2 | 1.46 | 3.2 | 130 |
| Embodiment 2 | 0.02 | 100.00 | 2.2 | 1.46 | 3.3 | 117 |
| Embodiment 3 | 0.02 | 100.00 | 2.3 | 1.47 | 3.8 | 110 |
| Embodiment 4 | 0.00 | 100.00 | 2.5 | 1.49 | 7.0 | 104 |

TABLE 2

|  | $SiO_2$ wt % | $Al_2O_3$ wt % | $B_2O_3$ wt % | CaO wt % | MgO wt % | $Na_2O$ wt % | $K_2O$ wt % | $Fe_2O_3$ wt % |
|---|---|---|---|---|---|---|---|---|
| Embodiment 1 | 85 | 1 | 9.98 | 0 | 0 | 3.0 | 1.0 | 0.0017 |
| Comparative example 1 | 63 | 17 | 8.4 | 8.4 | 3.1 | 0.1 | 0 | 0.0027 |
| Comparative example 2 | 62 | 15 | 0 | 0 | 4 | 14.8 | 4.2 | 0.0017 |
| Comparative example 3 | 70 | 3 | 8 | 8 | 0 | 12.0 | 0 | 0.0025 |
| Comparative example 4 | 67 | 12 | 0 | 0 | 2 | 7.9 | 0.1 | 0.0013 |

TABLE 2-continued

|  | Cl wt % | SrO wt % | Total wt % | Density g/cm$^3$ | Refractive index nd | CTE 10$^{-6}$/°C. | Flexural strength MPa |
|---|---|---|---|---|---|---|---|
| Embodiment 1 | 0.02 | 0 | 100.00 | 2.2 | 1.46 | 3.2 | 130 |
| Comparative example 1 | 0.00 | 0 | 100.00 | 2.5 | 1.54 | 4.0 | 130 |
| Comparative example 2 | 0.00 | 0 | 100.00 | 2.5 | 1.52 | 8.5 | 95 |
| Comparative example 3 | 0.00 | 7 | 100.00 | 2.6 | 1.57 | 8.0 | 90 |
| Comparative example 4 | 0.00 | 3 | 100.00 | 2.4 | 1.51 | 7.0 | 120 |

Raw materials were combined to be composition shown in Table 1 and Table 2.

However, for convenience of illustration, a component composition range of each embodiment and the comparative examples was illustrated up to the nearest tenth to the nearest hundredth only except $Fe_2O_3$, which was included a small amount, and a total content of each component becomes 100 wt %. Also, other components except the illustrated components were not included. After that, the combined raw mixture was molten by heating the mixed raw mixture at 1600° C. for three hours through a platinum crucible. Glass was uniformed by inserting a platinum stirrer and agitating the mixture for one hour during a melting operation. Subsequently, a glass plate having a thickness of 2 mm was obtained as examples 1 to 4 and comparative examples 1 to 4 by slowly cooling the molten glass at 730° C. Meanwhile, composition of obtained glass was determined through a florescence X-ray analysis.

Also, density, a refractive index, a CTE, and a flexural strength as physical properties of glass according to each example and comparative example were measured by using a method below, and results thereof have been shown in Table 1 and Table 2.

(Density)

Density of each glass was measured by using an Archimedes principle. In this case, a unit of density is g/cm$^3$.

(Refractive Index)

A refractive index was measured by using an Abbe refractometer which is generally used. A glass sample which was used for optical measurement was put on the refractometer, refractive index measurement solution having a refractive index written thereon was dropped on a glass surface, and then a refractive index of each glass was determined by determining that there is no difference in a refractive index between the solution and the glass.

(CTE)

An average CTE of each glass was measured by using a dilatometer. In this case, a unit of a CTE is 10$^{-6}$/° C.

(Flexural Strength)

Flexural strength of glass was measured by processing glass manufactured according to each example and comparative example in the form of a plate having a rectangular shape of a width of 50 mm, a length of 60 mm, and a thickness of 2 mm, and using a three-point bending test of a universal testing machine. In the case of the three-point bending test, since breakdown occurs at a glass edge, all edges of three-point bending test glass was mirror-like polished in order to make edge state of test glass same and then the glass was tested.

In this case, to reduce a measurement error, measurements were made such that the number of test pieces is at least 5 for each composition, and load velocity was fixed at 10 mm per minute.

Referring to Table 1, for glass of examples (examples 1 to 4), it was determined that density is 2.5 g/cm$^3$ or less. Particularly, in the case of examples 1 to 3, it was measured that density is 2.3 g/cm$^3$ or less, and in the case of examples 1 and 2, it was measured that density is 2.2 g/cm$^3$ or less, which is low. On the contrary, in the case of comparative examples, it was measured that all densities are 2.4 g/cm$^3$ or more. In the case of comparative examples 1 to 3, it was measured that density is 2.5 g/cm$^3$ to 2.6 g/cm$^3$, which is relatively higher than examples.

Also, it was measured that glass of example has a refractive index of 1.49 or less. Particularly, it was measured that glass of examples 1 to 3 has a refractive index of 1.47 or less. On the contrary, it was measured that all glass of comparative examples 1 to 4 had a refractive index exceeding 1.51, which is higher than examples.

Also, glass of examples shows an average CTE of 7.0 ($\times 10^{-6}$/° C.) or less. Particularly, glass of examples 1 to 3 shows an average CTE of less than 4.0 ($\times 10^{-6}$/° C.). On the contrary, glass of comparative example shows an average CTE of 4.0 ($\times 10^{-6}$/° C.) or more, and glass of comparative examples 2 to 4 shows an average CTE of 7.0 ($\times 10^{-6}$/° C.) or more, which is high.

Also, glass of example shows flexural strength of higher than 100 MPa.

Particularly, glass of examples 1 to 3 shows flexural strength of 110 Mpa or more, and as much as 130 MPa. On the contrary, glass of comparative examples 2 and 3 shows flexural strength of 95 MPa or less, which is very low.

Figure 6:
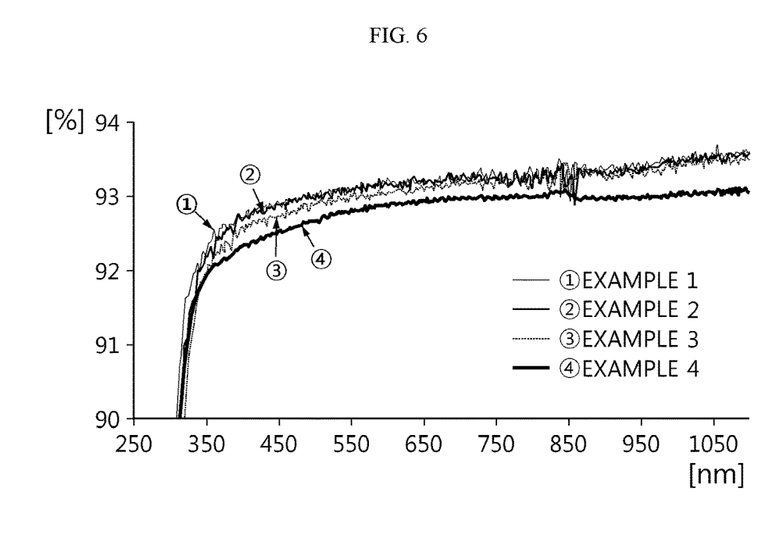
FIG. 6 is a graph of measuring transmittance of glass according to examples of the present disclosure.
Figure 7:
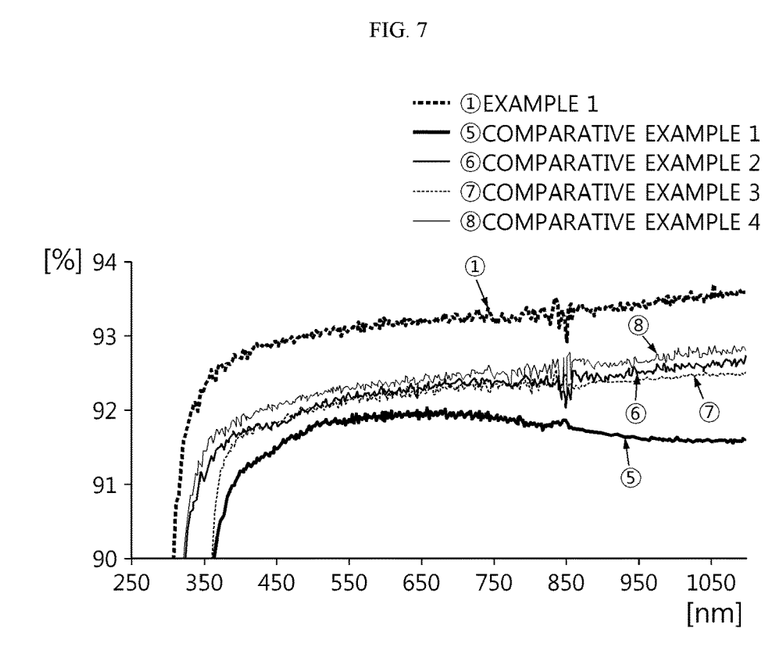
FIG. 7 is a graph of measuring transmittance of glass according to comparative examples.

Meanwhile, transmittance of a glass plate obtained as example and comparative example has been measured by using a UV-VIS-NIR spectrophotometer. For each experiment sample, to minimize measurement deviation between samples due to inner homogeneity, an integrating sphere has been used as a detector. Also, measurement results of transmittance are illustrated in FIGS. 6 and 7. That is, FIG. 6 is a graph of measuring transmittance of glass according to example of the present disclosure, and FIG. 7 is a graph of measuring transmittance of glass according to a comparative example. For convenience of comparison, FIG. 7 simultaneously illustrates measurement results of transmittance according to example 1.

Average transmittance of each example and each comparative example in the wavelength range from 380 nm to 780 nm, illustrated in FIGS. 6 and 7, are provided below.

EXAMPLES

Example 1

93.1%

Example 2

93.1%

Example 3

93.0%

Example 4

92.8%

Comparative Examples

Comparative Example 1

91.8%

Comparative Example 2

92.1%

Comparative Example 3

92.1%

Comparative Example 4

92.3%

Referring to FIG. 6 and the above measurement results of the average transmittance, a glass plate according to example of the present disclosure has transmittance of visible light (380 nm to 780 nm) higher than 92.5%. Particularly, a glass plate according to examples 1 to 3 shows average transmittance of 93% or more. Furthermore, average transmittance according to examples 1 and 2 is 93.1%, which is very high.

On the contrary, referring to FIG. 7 and the above measurement results of the average transmittance, a glass plate according to comparative examples shows transmittance of a level of about 92%, which is lower than embodiments. Particularly, when compared with the measurement result of example 1, the transmittance of visible light according to comparative example shows a difference of about 1%. 1% is a very meaningful increase rate in an aspect of transmittance. Particularly, in a high transmittance range greater than 90%, a transmittance increase of 0.1% is considered as being very effective.

Therefore, referring to results of FIGS. 6 and 7, the borosilicate glass plate according to the present disclosure shows excellent transmittance in a visible light wavelength region from 380 nm to 780 nm. Therefore, it is considered that the light-guiding plate including the borosilicate glass plate according to the present disclosure performs a function as a very excellent light-guiding plate.

Although the present disclosure has been described with reference to limited embodiments and drawings, the present disclosure is not limited thereto and it will be understood by those of ordinary skill in the art that various changes and modifications in form and details may be made within the scope of the present disclosure and equivalents as defined by the following claims.

Meanwhile, it is obvious to those of ordinary skill in the art that in the case where terms representing directions such as up, down, and left are used in the present specification, these terms represent a relative position and are used for convenience of description only, and may change depending on a location of an object or a location of an observer.

What is claimed is:

1. A glass light-guiding plate comprising a glass plate comprising:
   80 to 85 wt % $SiO_2$;
   5 to 20 wt % $B_2O_3$;
   1 to 5 wt % $Al_2O_3$;
   3 to 8 wt % $R_2O$ where R is at least one of Li, Na, and K; and
   $Fe_2O_3$ in an amount <0.0025 wt %,
   wherein the only oxides present in the glass plate are $SiO_2$, $B_2O_3$, $Al_2O_3$, and $R_2O$ where R is at least one of Li, Na, and K, and $Fe_2O_3$.

2. The glass light-guiding plate of claim 1, wherein the glass plate further comprises 0 to 0.5 wt % $SO_3$ or Cl as a clarifier.

3. The glass light-guiding plate of claim 2, wherein sum of contents of $SiO_2$, $B_2O_3$, $Al_2O_3$, $R_2O$, $Fe_2O_3$, $SO_3$, and Cl in the glass plate is 100 wt %.

4. The glass light-guiding plate of claim 1, wherein the glass plate comprises $K_2O$>0.1 wt %.

5. The glass light-guiding plate of claim 1, wherein the glass plate with a thickness of 2 mm has transmittance of 92.5% or more for visible light (380 nm to 780 nm).

6. The glass light-guiding plate of claim 1, wherein the glass plate has a refractive index of 1.49 or less.

7. The glass light-guiding plate of claim 1, wherein the glass plate has a thickness of 2 mm or less.

8. The glass light-guiding plate of claim 1, wherein the glass plate comprises a compression stress layer on a surface thereof in which glass having the above composition is chemically reinforced.

9. A backlight unit comprising the glass light-guiding plate of claim 1.

10. A display device comprising the glass light-guiding plate of claim 1.

11. A method of manufacturing a glass light-guiding plate, the method comprising:
    combining and melting glass raw materials such that the glass raw materials comprise:
    80 to 85 wt % $SiO_2$;
    5 to 20 wt % $B_2O_3$;
    1 to 5 wt % $Al_2O_3$;
    3 to 8 wt % $R_2O$ where R is at least one of Li, Na, and K; and
    $Fe_2O_3$ in an amount <0.0025wt %,
    wherein the only oxides present are $SiO_2$, $B_2O_3$, $Al_2O_3$, $R_2O$ where R is at least one of Li, Na, and K, and $Fe_2O_3$; and
    forming the molten glass raw materials as a glass plate.

* * * * *